(12) United States Patent
Olofsson (10) Patent No.: US 8,170,486 B2
(45) Date of Patent: May 1, 2012

(54) WIRELESS HEADSET WITH FM TRANSMITTER

(75) Inventor: Petter Martin Elov Olofsson, Loddekopinge (SE)

(73) Assignee: Sony Mobile Communications AB, Lund (SE)

( * ) Notice: Subject to any disclaimer, the term of this patent is extended or adjusted under 35 U.S.C. 154(b) by 586 days.

(21) Appl. No.: 11/968,508

(22) Filed: Jan. 2, 2008

(65) Prior Publication Data
US 2009/0170436 A1   Jul. 2, 2009

(51) Int. Cl.
*H04B 7/00* (2006.01)
(52) U.S. Cl. .................... 455/41.3; 455/569.1
(58) Field of Classification Search .......... 455/419, 455/420, 20, 41.2, 41.3, 42, 569.1, 569.2, 455/575.2, 575.6
See application file for complete search history.

(56) References Cited

U.S. PATENT DOCUMENTS

| 2006/0105817 A1* | 5/2006 | Naick et al. ............ 455/567 |
| 2007/0049197 A1* | 3/2007 | Klein .................... 455/41.2 |
| 2007/0173293 A1* | 7/2007 | Tran ..................... 455/569.1 |
| 2007/0281648 A1* | 12/2007 | Rokusek et al. .......... 455/206 |
| 2008/0165984 A1* | 7/2008 | Yun et al. ................ 381/86 |

FOREIGN PATENT DOCUMENTS

| JP | 2001008274 A | 1/2001 |
| JP | 2001203788 A | 7/2001 |
| JP | 2007013617 A | 1/2007 |

OTHER PUBLICATIONS

International Search Report and Written Opinion issued in international application No. PCT/IB2008/052628, mailed Jan. 23, 2009, 13 pages.

* cited by examiner

*Primary Examiner* — Ping Hsieh
(74) *Attorney, Agent, or Firm* — Snyder, Clark, Lesch & Chung, LLP (57) ABSTRACT

A method and device are provided for relaying audio from a source audio device via a wireless headset. Audio signals are received from the source audio device via a first wireless communications protocol. Instructions are received to activate a transmitter associated with a second wireless communications protocol different from the first wireless communications protocol. The received audio signals are output via the transmitter.

20 Claims, 6 Drawing Sheets

WIRELESS HEADSET WITH FM TRANSMITTER

BACKGROUND

Portable communications devices and personal audio or multimedia devices may be operable in conjunction with headphones, headsets, or other accessory devices for the purpose of enabling users to listen to audio output from the devices in either a handsfree manner or without adversely interacting with others in their immediate environment. Wireless communications protocols are known for transmitting audio from a source device to a compatible headset or pair of stereo headphones.

SUMMARY

According to one aspect a method may include receiving audio signals from a source audio device via a first wireless communications protocol; receiving instructions to activate a transmitter associated with a second wireless communications protocol different from the first wireless communications protocol; and outputting the received audio signals via the transmitter.

Additionally, the first wireless communications protocol may include a short-range radio frequency wireless communications protocol.

Additionally, the short-range radio frequency wireless communications protocol may include a Bluetooth protocol.

Additionally, the second wireless communications protocol may include one of: frequency modulation (FM) radio signal transmission or amplitude modulation (AM) radio signal transmission Additionally, receiving instructions to activate a transmitter may further include receiving configuration settings associated with the transmitter, the configuration settings designating a frequency on which to output the received audio signals.

Additionally, receiving the configuration settings may further include receiving non-music audio handling instructions designating how non-music audio received from the source audio device is to be handled.

Additionally, the non-music handling instructions may include one of: instructions to output non-music audio via the transmitter or instructions to prevent output of non-music audio via the transmitter.

Additionally, the non-music audio may include telephone call audio.

Additionally, the method may further include receiving non-music audio from the source audio device; and performing one of outputting the non-music audio via the transmitter or preventing output of the non-music audio via the transmitter based on the received non-music audio handling instructions.

Additionally, preventing output of the non-music audio via the transmitter may include muting the transmitter for a duration of non-music reception from the source audio device.

Additionally, outputting the non-music audio via the transmitter may include activating a speakerphone feature.

In a second aspect, a wireless listening device may include a short-range wireless transceiver to receive audio from a source audio device via a first wireless communications protocol; a transmitter to output the received audio via a second wireless communications protocol different from the first wireless communications protocol; and a processor to receive configuration instructions and activate the transmitter in response to the configuration instructions.

Additionally, the second wireless communications protocol may include frequency modulation (FM) broadcasting.

Additionally, the wireless listening device may include an input device for receiving the configuration instructions.

Additionally, the configuration instructions may include transmitter activation instructions and a broadcast frequency on which the transmitter outputs the received audio.

Additionally, the configuration instructions may include non-music audio handling instructions.

Additionally, the short-range wireless transceiver may include a Bluetooth transceiver.

In a third aspect, a device may include means for receiving audio signals from a source audio device via a Bluetooth connection, where the audio signals comprise music audio signals and non-music audio signals; means for receiving non-music audio handling instructions; means for transmitting audio signals received from the source audio device via a frequency modulation (FM) frequency signal; and means for handling non-music audio received from the source audio device based on the received non-music handling instructions.

Additionally, the non-music audio handling instructions may indicate whether or not non-music audio is to be transmitted via the FM frequency signal.

Additionally, the device may include means for muting the non-music audio signals when the non-music audio handling instructions indicate that non-music audio is not to be transmitted via the FM frequency signal.

Additionally, the device may include means for activating a speakerphone feature when the non-music audio handling instructions indicate that non-music audio is to be transmitted via the FM frequency signal.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

A system and a method are described for enabling a smooth transition of audio from a first listening device to second listening device via a FM (frequency modulation) or AM (amplitude modulation) transmitter incorporated into the first listening device. In one implementation, a mobile device (e.g., a mobile telephone) may communicate audio signals to a headset device via a wireless protocol, such as the Bluetooth™ protocol. The headset device may, in turn, relay the received audio signals to a second listening device (e.g., a automobile stereo) via an FM transmitter. By providing for relay of audio from a personal headset accessory to another listening device, listening of audio from the mobile device may easily transition from a first device to a second device, depending on the listening environment desired by the user.

Exemplary System

Figure 1:
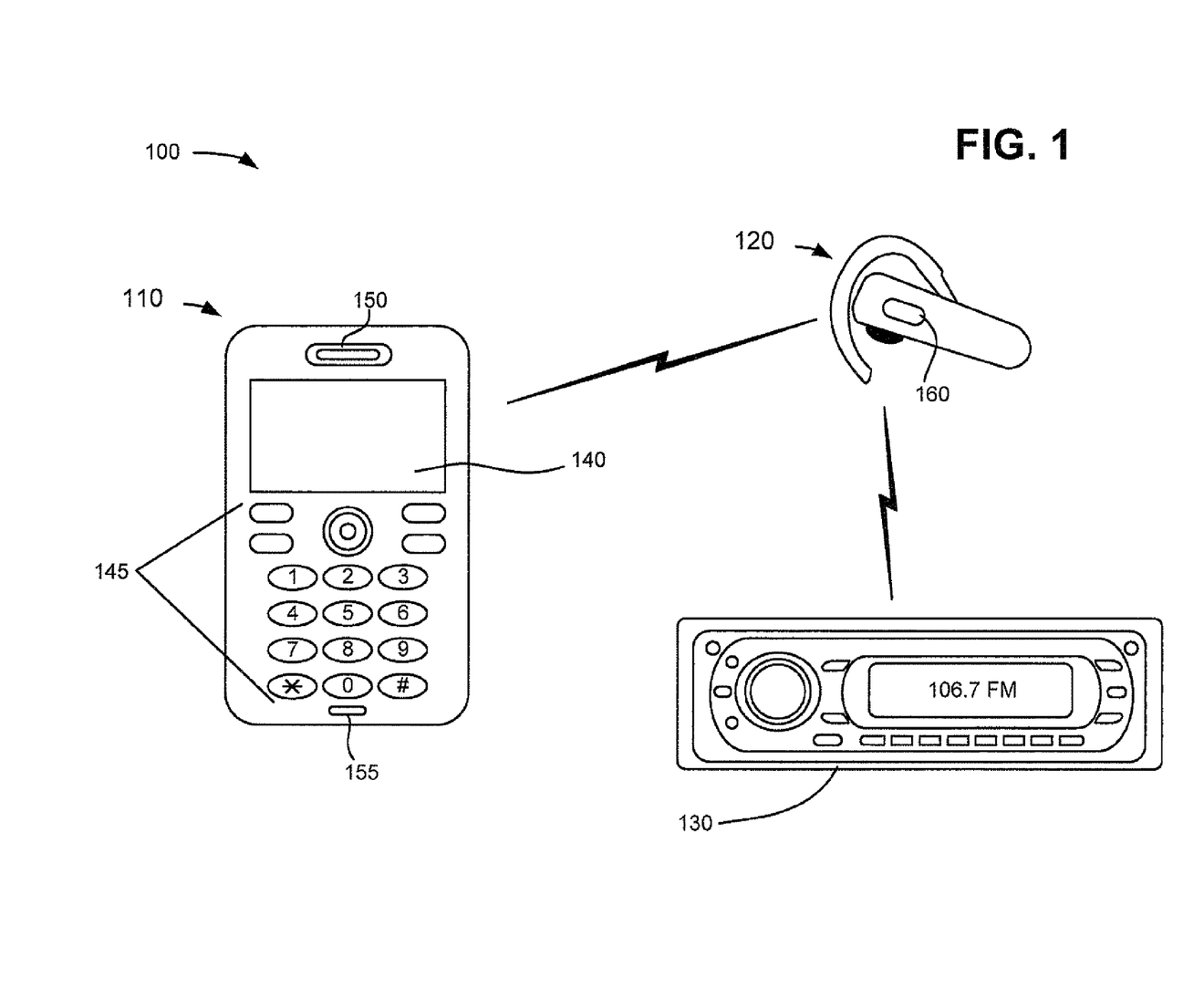
FIG. 1 is a diagram of an exemplary system in which systems and methods described herein may be implemented.

FIG. 1 is a diagram of an exemplary system 100 in which systems and methods described herein may be implemented. As illustrated in FIG. 1, system 100 may include a source audio device 110, a first listening device 120, and a second listening device 130. In one embodiment, source audio device 110 may include a display 140, a keypad 145, a speaker 150, and a microphone 155. The term "component," as used herein, is intended to be broadly interpreted to include hardware, software, and/or a combination of hardware and software.

Display 140 may include any component capable of providing visual information. For example, in one implementation, display 140 may be a liquid crystal display (LCD). In another implementation, display 140 may be any one of other display technologies, such as a plasma display panel (PDP), a field emission display (FED), a thin film transistor (TFT) display, etc. Display 140 may display, for example, text, image, and/or video information to a user.

Keypad 145 may include any component capable of providing input to source audio device 110. Keypad 145 may include a standard telephone keypad. Keypad 145 may also include one or more special purpose keys. In one implementation, each key of keypad 145 may be, for example, a push-button. A user may utilize keypad 145 for entering information, such as text or a phone number, configuration information, or activating a special function.

Speaker 150 may include any component capable of transducing an electrical signal to a corresponding sound wave. For example, a user may listen to music or listen to a calling party through speaker 150. Microphone 155 may include any component capable of transducing air pressure waves to a corresponding electrical signal. For example, a user may speak into microphone 155 during a telephone call.

Source audio device 110 is intended to be broadly interpreted to include any number of devices that may operate in cooperation with a peripheral device, such as a hands-free device. For example, source audio device 110 may include a portable device, such as a wireless telephone, a PDA, an audio player, an audio/video player, an MP3 player, a gaming device, a computer, or another kind of communication, computational, and/or entertainment device. In other instances, source audio device 110 may include a stationary device, such as an audio player, an audio/video player, a gaming device, a computer, or another kind of communication, computational, and/or entertainment device. Still further, source audio device 110 may include a communication, computational, and/or entertainment device in an automobile, in an airplane, etc. Accordingly, although FIG. 1 illustrates exemplary external components of source device 110, in other implementations, source audio device 110 may contain fewer, different, or additional external components than the external components depicted in FIG. 1. Additionally, or alternatively, one or more external components of source audio device 110 may perform the functions of one or more other external components of source audio device 110. For example, display 140 may be an input component (e.g., a touch screen). Additionally, or alternatively, the external components may be arranged differently than the external components depicted in FIG. 1.

First listening device 120 may include a personal listening device, such as an audio headset or headphones configured to facilitate personal listening of audio signals originating from source audio device 110. First listening device 120 may receive audio signals from source audio device 110 via any suitable wireless connection. For example, in one embodiment, first listening device 120 may communicate with source audio device 110 via a Bluetooth™ or other similar short-range wireless connection.

First listening device 120 may include one or more input mechanisms 140 and/or a display (not shown). Input mechanism 160 may enable users to activate one or more features of first listening device 120, such as a mode of operation, a volume of output audio, configuration settings, etc.

Second listening device 130 may include another listening device, such as a car stereo, a home stereo, a portable radio, etc. Second listening device 130 may be configured to receive FM or AM broadcast signals. In one implementation, second listening device 130 may be a listening device not independently capable of receiving audio signals directly from source audio device 110. Second listening device 130 may be tunable to receive a broadcast signal from first listening device 120 on a frequency selected by one of the source audio device 110 or first listening device.

It should be understood that the above descriptions of devices 110, 120, and 130 are provided for exemplary purposes only and that each of devices 110, 120, and 130 may include additional components and features commensurate with their respective functions. Further, the number of devices 110, 120, and 130 illustrated in FIG. 1 is provided for simplicity. In practice, a typical system may include more mobile devices 110, 120, or 120 than illustrated in FIG. 1.

In one implementation described below, source audio device 110 may communicate with first listening device 120 wirelessly using a number of short distance wireless communication protocols. For example, as briefly described above, source audio device 110 may communicate with first listening device 120 using a Bluetooth protocol. Bluetooth is a short-range wireless connectivity standard that uses specific radio frequencies to enable communication between devices within a predetermined proximity to each other. Communication between mobile devices 110 may be established and initiated through a pairing process by which source audio device 110 and first listening device 120 are identified to each other. Devices 110 and 120 may also communicate using one or more other short distance wireless communication protocols, such as UltraWideBand, or IEEE 802.11x-based communication protocols.

Exemplary Source Audio Device Configuration

Figure 2:
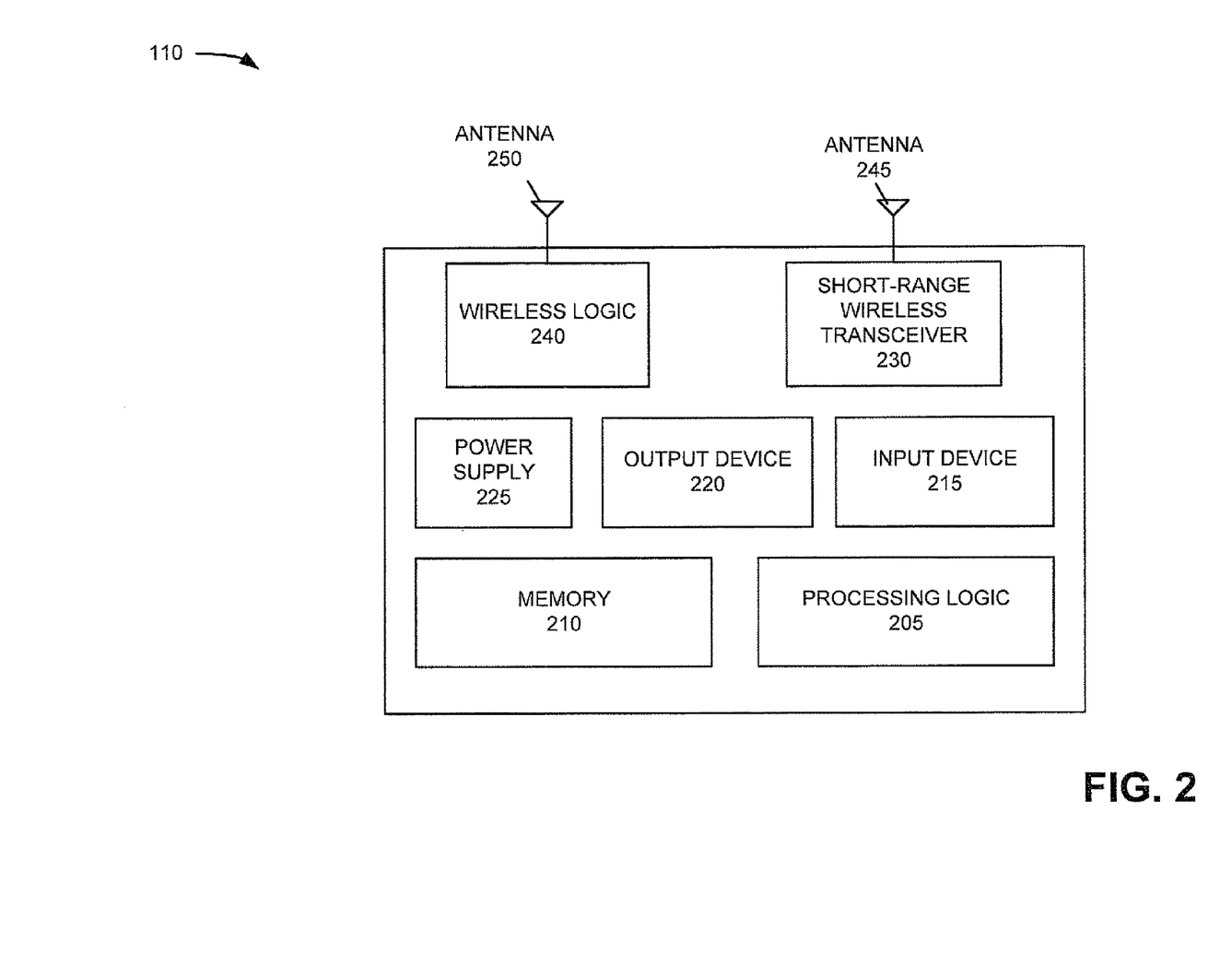
FIG. 2 is a diagram of an exemplary source audio device of FIG. 1.

FIG. 2 is an exemplary diagram of source audio device 110. As illustrated in FIG. 2, source audio device 110 may include processing logic 205, a memory 210, an input device 215, an output device 220, a power supply 225, a short-range wireless transceiver 230, headset configuration logic 235, wireless logic 240, and antennas 245 and 250. It will be appreciated that source audio device 110 may include other components (not shown) that aid in receiving, transmitting, and/or processing data. Moreover, it will be appreciated that other configurations are possible.

Processing logic 205 may include any type of processor or microprocessor that may interpret and execute instructions. Logic, as used herein, may include hardware, software, and/or a combination of hardware and software. In other implementations, processing logic 205 may be implemented as or include an application specific integrated circuit (ASIC), a field programmable gate array (FPGA), or the like.

Memory 210 may include any type of storing/memory component to store data and instructions related to the operation and use of source audio device 110. For example, memory 210 may include a memory component, such as a random access memory (RAM), a dynamic random access memory (DRAM), a static random access memory (SRAM), a synchronous dynamic random access memory (SRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. Additionally, memory 210 may include a storage component, such as a magnetic storage component (e.g., a hard disk), a compact disc (CD) drive, a digital versatile disc (DVD), or another type of computer-readable medium, along with their corresponding drive(s). Memory 210 may also include an external storing component, such as a USB memory stick, a memory card, and/or a subscriber identity module (SIM) card.

Memory 210 may be configured to store information and instructions for execution by processing logic 205, a read only memory (ROM) or another type of static storage device that may store static information and instructions for the processing logic 205, and/or some other type of magnetic or optical recording medium and its corresponding drive for storing information and/or instructions. Instructions executable by processing logic may include applications or programs, such as a telephone directory, camera, a DAP, a digital media player (DMP), an organizer, a text messenger, a web browser, a calendar, games, etc.

Input device 215 may include a device that permits a user to input information to mobile device 110-A, such as a keypad, a keyboard, a mouse, a pen, a microphone, one or more biometric mechanisms, and the like. Output device 220 may include a device that outputs information to the user, such as a display, a printer, a speaker, etc. Power supply 225 may include a battery, or the like, for providing power to the components of mobile device 110-A.

Short-range, wireless transceiver 230 may include a transmitter and receiver device capable of enabling exchange of data and control signals using the Bluetooth protocol (or any other suitable, short-range wireless communications protocol) with one or more Bluetooth-enabled devices. As described briefly above, the Bluetooth protocol is a short range radio frequency standard for enabling the creation of personal area networks or PANs. Pairs of Bluetooth-enabled devices may connect to each other to form a network and exchange information. Exemplary Bluetooth-enabled devices include mobile phones, headsets, media players, PDAs, and mobile computers. Exemplary implementations of source audio device 110 may support the A2DP profile associated with the Bluetooth protocol. The AD2P profile enables wireless transmission of high quality stereo audio to connected devices.

Wireless logic 240 may include a transceiver device capable of transmitting and receiving data and control signals using a wireless communications protocol such as a cellular radiotelephone protocol (e.g., GSM (global system for mobile communications), PCS (personal communication services), FDMA (frequency division multiple access), CDMA (code division multiple access), TDMA (time division multiple access), etc.). In additional implementations, wireless logic 240 may use short distance wireless communication protocols such as the Bluetooth protocol, one or more of the IEEE 802.11 protocols, the WiMax protocol, the Ultra Wideband protocol, or any other suitable wireless communication protocol.

Antennas 245 and 250 may include, for example, one or more directional antennas and/or omni directional antennas.

In one implementation consistent with aspects described herein, processing logic 205 may be configured to receive FM transmitter configuration settings associated with first listening device 120. Such configuration settings may include activation of the FM transmission feature, audio-type handling instructions, and transmission frequency settings. Additional details regarding this functionality are set forth in additional detail below.

Figure 3:
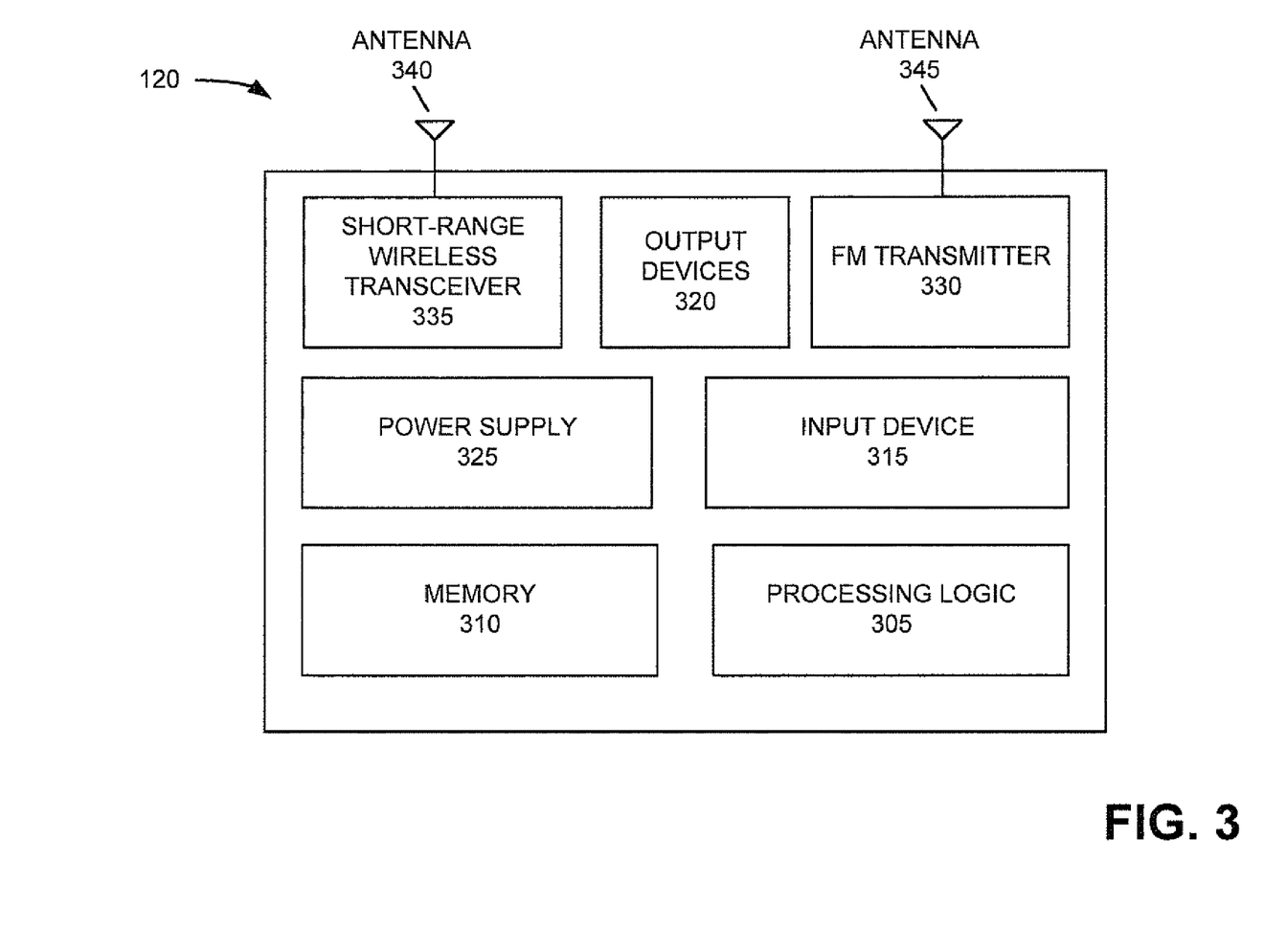
FIG. 3 is a diagram of an exemplary first listening device of FIG. 1.

FIG. 3 is an exemplary diagram of first listening device 120. As illustrated, mobile device 110-B may include processing logic 305, a memory 310, an input device 315, output devices 320, a power supply 325, an FM (or AM) transmitter 330, a short-range wireless transceiver 335, and antennas 340 and 345. It will be appreciated that first listening device 120 may include other components (not shown) that aid in receiving, transmitting, and/or processing data. Moreover, it will be appreciated that other configurations are possible.

As with processing logic 205 described above, processing logic 305 may also include any type of processor or microprocessor that may interpret and execute instructions. Memory 310 may include a random access memory (RAM) or another type of dynamic storage device that may store information and instructions for execution by processing logic 305, a read only memory (ROM) or another type of static storage device that may store static information and instructions for the processing logic 305, and/or some other type of magnetic or optical recording medium and its corresponding drive for storing information and/or instructions.

Input device 315 may include a device that permits a user to input information or commands to mobile device 110-B, such as a keypad having one or more buttons, a keyboard, a mouse, a pen, a microphone, one or more biometric mechanisms, and the like. Output devices 320 may include a speaker for outputting audible sounds to a user, as well as a display or other device for outputting visual information to the user.

Power supply 325 may include a battery, or the like, for providing power to the components of first listening device 120. Short-range wireless transceiver 335 may include a transmitter and receiver device capable of enabling exchange of data and control signals using the Bluetooth protocol (or other suitable short range communications protocol) with one or more Bluetooth-enabled devices, such as source audio device 110.

FM transmitter 330 may include a transmitter capable of receiving audio signals received via short-range wireless transceiver 330 and broadcasting the signals via an FM radio signal. In alternative implementations, FM transmitter 330 may broadcast radio signals using other suitable modulation schemes, such as amplitude modulation (AM), etc. In one implementation, activation and configuration of FM transmitter 330 may be performed at first listening device 120 via input device 315, output devices 320, and processing logic 305. Alternatively, activation and configuration of FM transmitter 330 may be performed at source audio device 110, with instructions relating thereto being transmitted to first listening device 120 via short-range wireless transceiver 330 or any other suitable mechanism (e.g., universal serial bus connection, etc.).

Antennas 340 and 345 may include, for example, one or more directional antennas and/or omni directional antennas associated with short-range wireless transceiver 335 and FM transmitter 330, respectively.

As will be described in detail below, source audio device 110 may use short-range wireless transceiver 230 to transmit audio signals to first listening device 120 using a first communication protocol or type. Based on instructions received at first listening device 120, an FM audio signal corresponding to the audio signal received from source audio device 110 may be relayed to second listening device 130. In one implementation, upon relay of the audio signal via FM transmitter 330, output of audio via output devices 320 (e.g., a speaker) may be ceased or disrupted.

In this manner, listening to audio signals originating at source audio device 110 may follow a user to a number of different listening devices, including those that do not support the reception of audio signals via the short-range wireless protocol being used by first listening device 120 and source audio device 110. Source audio device 110 and first listening device 120 may perform these operations and other operations in response to processing logic 205 and 305, respectively, executing software instructions contained in a computer-readable medium, such as memory 210 or 310, respectively. A computer-readable medium may be defined as a physical or logical memory device.

The software instructions may be read into memory 210 or 310 from another computer-readable medium or from another device via, for example, short-range wireless transceiver 230/335 or wireless logic 245. The software instructions contained in memory 210/310 may cause processing logic 205/305 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

Figure 4:
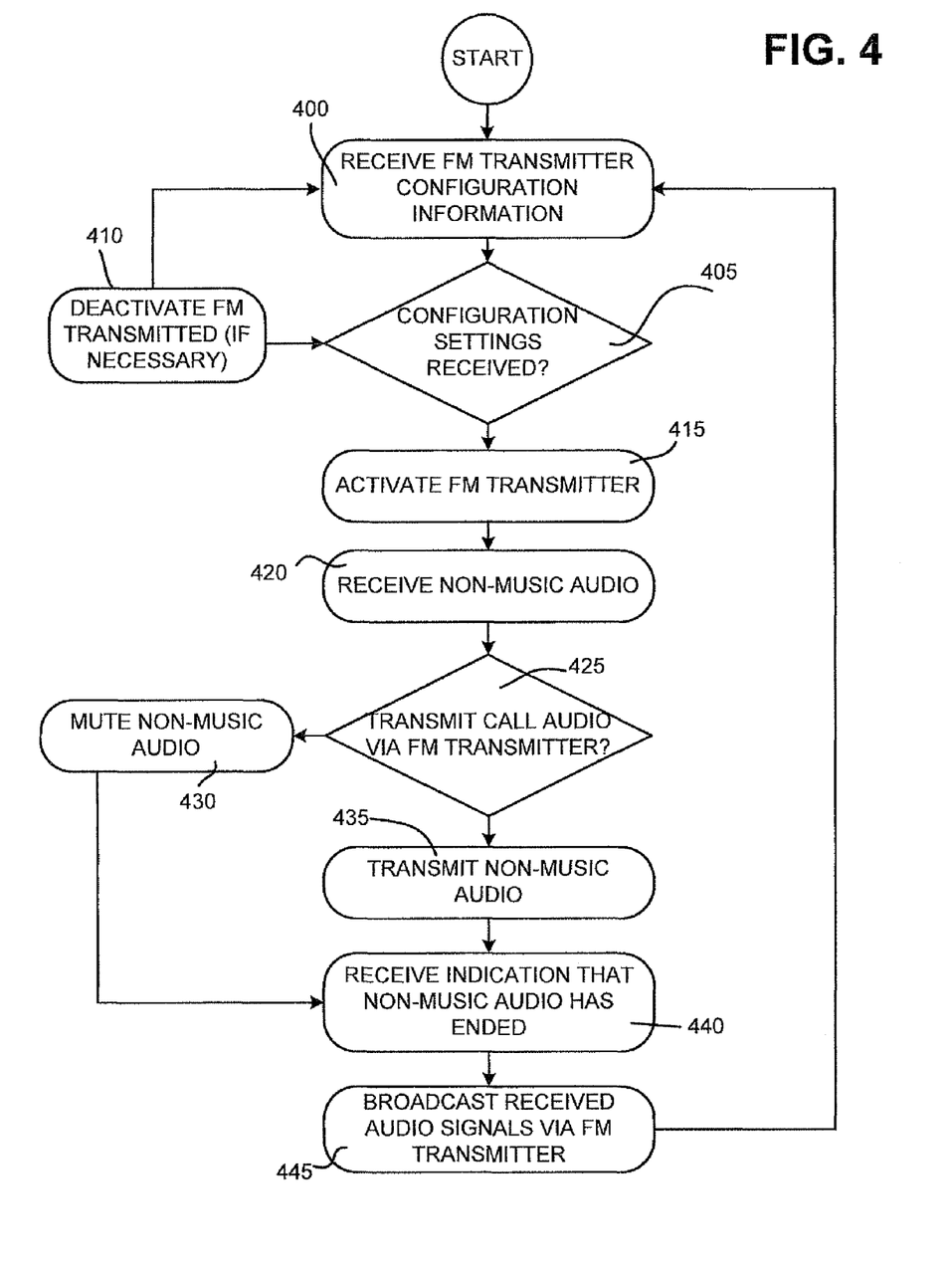
FIG. 4 is a flowchart of an exemplary process for facilitating relay of audio between the devices of FIG. 1.

FIG. 4 is a flowchart of an exemplary process for facilitating relay of audio from source audio device 110 to second listening device 130 via an FM transmitter incorporated into first listening device 120 wirelessly connected to source audio device 110. It will be assumed for this process that source audio device 110 and first listening device 120 have previously established a short distance wireless connection.

Processing may begin with first listening device 120 receive FM transmitter configuration information (block 400). The received FM transmitter configuration information may include instructions relating to a transmission frequency and audio handling instructions relating to handing of audio received from source audio device 110. As described above, in one implementation, configuration information for FM transmitter 330 may be received in source audio device 110 and passed to first audio device via, e.g., short-range wireless transceiver 230. In another implementation, configuration information for FM transmitter 330 may be received directly in first listening device 120 via input device 315.

Upon receipt of the FM transmitter configuration information, it may be determined whether FM transmitter 330 should be enabled (block 405). If FM transmitter 330 should not be enabled (block 405:NO), FM transmitted 330 may be deactivated (if previously active) (block 410) and processing may return to block 400 to await receipt of subsequent configuration instructions. When it is determined that the received configuration information indicates that FM transmitter 330 should be enabled (block 405:YES), FM transmitter 330 is activated at a frequency indicated in the received configuration information (block 415).

A telephone call or other non-music audio signal may be received at source audio device 110 (block 420). It may be determined, based on the received configuration information, whether the non-music audio is to be transmitted via FM transmitter 330 or whether the non-music audio is to be maintained in first listening device 120 (block 425). When it is determined that the non-music audio is to be transmitted via FM transmitter 330 (block 425:YES), all audio received by first listening device 120 may be transmitted by FM transmitter 330 (block 430). In this mode of operation, FM transmitter 330 may be incorporated in a speakerphone system encompassing source audio device 110, first listening device 120, and second listening device 130.

Alternatively, when it is determined that the non-music audio is not to be transmitted via FM transmitter 330 (block 425:YES), audio signals transmitted via FM transmitter 330 may be muted and the non-music audio may be maintained in first listening device 120 (block 435). In this mode of operation, potentially sensitive or private call audio is not broadcast via FM transmitter. However, rather than deactivate FM transmitter 330 for the duration of the non-music audio, muting the broadcast ensures that second listening device 120 does not output static or other audio during the call, thereby increasing the user's experience during the call. In another implementation (not shown), first listening device 120 may continue to broadcast non-call audio (e.g., music) via FM transmitter 330, while non-music audio is handled in first listening device 120. In one implementation, alert audio, such as ring tones, etc. may be transmitted via FM transmitter 330 regardless of the selected disposition of the call audio. In this manner, a user may be alerted to an incoming call, while not handling source audio device 110 or even first listening device 120.

First listening device 120 may receive an indication from source audio device 110 that the non-music audio signal has ended (block 440). First listening device 120 may continue broadcasting received audio signals via FM transmitter 330 (block 445). Processing may continue to block 400 for receipt of additional FM transmitter configuration information (e.g., instructions to deactivate FM transmitter 330).

Figure 5:
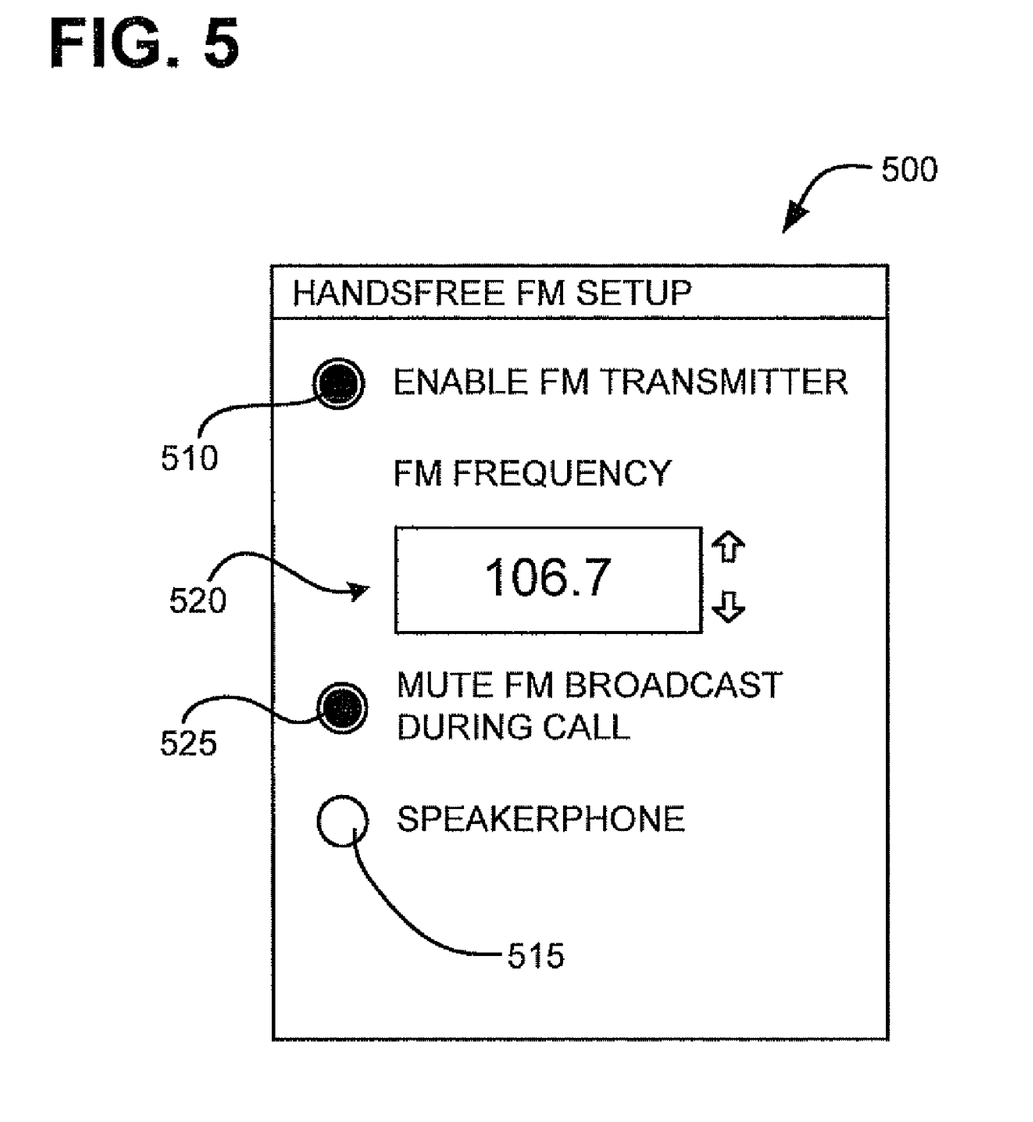
FIG. 5 is an exemplary graphical user interface for receive the FM transmitter configuration information of FIG. 4.

FIG. 5 is an exemplary implementation of a graphical user interface (GUI) 500 for receiving FM transmitter configuration information in source audio device 110. As illustrated, GUI 500 includes several configuration settings relating to FM transmitter 330 including an enable FM transmitter option 510, a frequency selection element 515, a mute FM broadcast during call option 520, and a speakerphone option 525. In one implementation, GUI 500 may be provided on display 115 of source audio device 110, with setting selections being made by manipulation of suitable keys on keypad 145.

Enable FM transmitter option 510 may include a selectable element indicating that FM transmitter 330 of first listening device 120 is to be activated. Upon selection of option 510, source audio device 110 may transmit suitable instructions to first listening device 120 initiating activation of FM transmitter 330 at a frequency indicated by a value of frequency selection element 515. In some implementations, the FM transmission frequencies available in frequency selection element 515 may be limited in compliance with any suitable regulations or standards. If source audio device 110 is configured to handle more than one type of audio signal, e.g., music, telephone communications, alarms, alerts, etc., GUI 500 may be configured to indicate handling for some or all potential audio types.

As shown in FIG. 5, when source audio device 110 is a mobile radiotelephone, GUI 500 may include an option for enabling muting of an active FM broadcast during reception of a telephone call by way of option 520. Alternatively, users may elect to utilize second listening device as part of a speakerphone system relating to source audio device 110 by selection option 525. By selecting option 525, music relayed to second listening device 120 via FM transmitter 330 may be muted and replaced with audio corresponding to a received or placed telephone call, with microphone 155 on source audio device 110 providing audio input to the telephone call.

Figure 6:
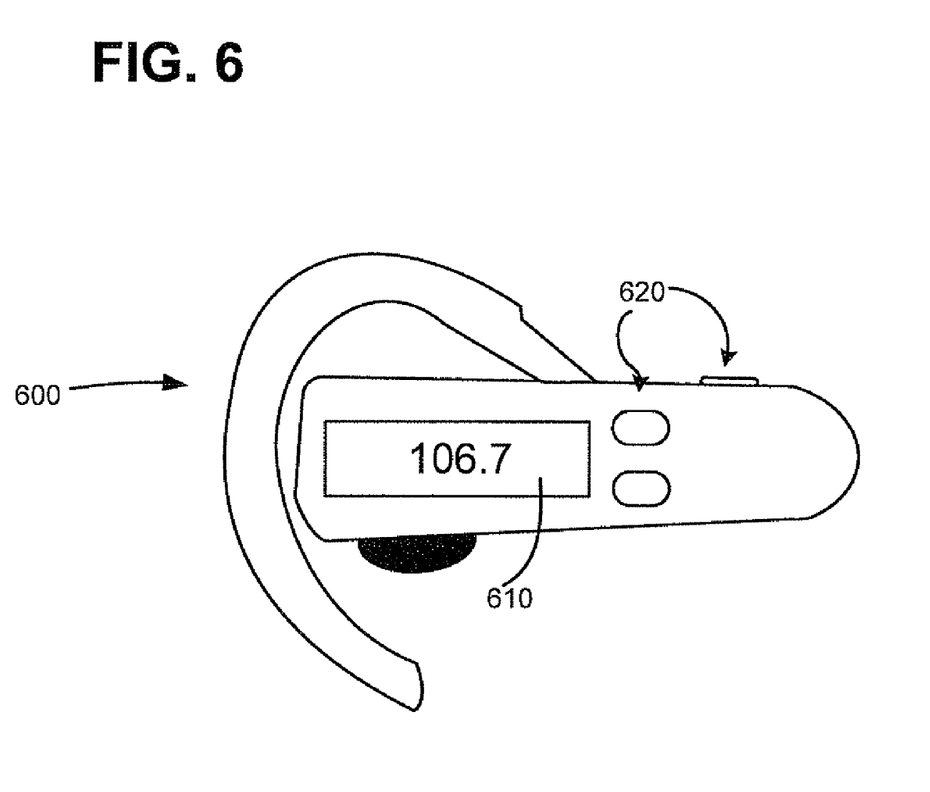
FIG. 6 is an illustration of an exemplary first listening device of FIG. 1 configured to receive FM transmitter configuration information.

FIG. 6 is an exemplary implementation of a first listening device 600 having a display 610 and user interface 620 suitable for receiving the FM transmitter configuration and activation information directly within first listening device 120. As illustrated, display 610 may be configured to display a broadcast frequency for FM transmitter 330. User interface 620 may include a collection of buttons or other interface elements for receive activation instructions for FM transmitter 330 and manipulation of a broadcast feature and/or other audio handling instructions. By providing the configuration of these settings from directly within first listening device 600, a need to support such a feature in first listening device 600 with source audio device 110 is removed, thereby rendering first listening device applicable to a wider variety of source audio devices.

By providing a first listening device (e.g., a wireless headset) that is configured to receive wireless audio signals of a first type (e.g. Bluetooth audio) from a source audio device (e.g., a cellular telephone) with an FM transmitter capable of forwarding or relaying audio received from the source audio device to one or more second listening devices (e.g., FM radios), user convenience in listening to audio from the source device may be significantly increased. Rather than requiring a user to discontinue listening to music to either change music sources or connect the source device to the second listening device via alternate means, (such as wired connections or adapters), users may seamlessly continue enjoyment of their music from the first listening device to the second listening device.

CONCLUSION

Implementations described herein may provide a system and method for significantly increasing usability of the wireless music capabilities of portable electronic devices. In one implementation, an FM transmitter provided in a first listening device may relay audio signals received from a source audio device to one or more second listening devices.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while the description above focused on using the Bluetooth protocol to establish wireless communication between the source audio device and the first listening device, it will be appreciated that other wireless communication protocols (e.g., WiMax, ultrawideband, 802.11 technologies, etc.) could alternatively be used to establish communication between the devices.

While series of acts have been described with regard to FIG. 4, the order of the blocks may be modified in other implementations consistent with the principles of the invention. Further, non-dependent blocks may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one would be able to design software and control hardware to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

Further, certain portions of the invention may be implemented as "logic" that performs one or more functions. This logic may include hardware, such as an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
  receiving, by a first listening device, audio signals from a source audio device via a first wireless communications protocol, the audio signals including music audio signals and non-music audio signals;
  receiving, by the first listening device, instructions to activate a transmitter associated with a second wireless communications protocol, where the second wireless communications protocol is different from the first wireless communications protocol;
  outputting, by the first listening device, the received music audio signals, via the transmitter, to a second listening device while preventing an output of the non-music audio signals via the transmitter to the second listening device; and
  outputting, by the first listening device and in conjunction with outputting the received music audio signals, the received non-music audio signals via a speaker of the first listening device.

2. The method of claim 1, where the first wireless communications protocol comprises a short-range radio frequency wireless communications protocol.

3. The method of claim 2, where the short-range radio frequency wireless communications protocol comprises a Bluetooth protocol.

4. The method of claim 1, where the second wireless communications protocol comprises one of:
  frequency modulation (FM) radio signal transmission, or
  amplitude modulation (AM) radio signal transmission.

5. The method of claim 1, where the receiving the instructions to activate the transmitter further comprises:
  receiving configuration settings associated with the transmitter, the configuration settings designating a frequency on which to output the received music audio signals.

6. The method of claim 5, where the receiving the configuration settings, further comprises:
   receiving non-music audio handling instructions designating how the non-music audio signals, received from the source audio device, are to be handled, where the configuration settings, including the non-music audio handling instructions, and where the configuration settings are received by the first listening device via a user input device of the first listening device.

7. The method of claim 6, where the non-music audio signals comprise telephone call audio.

8. The method of claim 5, further comprising:
   receiving an alert audio from the source audio device; and
   outputting the alert audio via:
      the transmitter, to the second listening device, while preventing output of the non-music audio signals not comprising the alert audio via the transmitter based on the received non-music audio handling instructions, and
      the speaker of the first listening device.

9. The method of claim 1, where the receiving the instructions to activate the transmitter, further comprises:
   muting the transmitter for a duration of non-music reception from the source audio device.

10. The method of claim 8, where the outputting the alert audio via the transmitter further comprises:
   activating a speakerphone feature of the first listening device.

11. A wireless listening device, comprising:
   a short-range wireless transceiver to receive audio from a source audio device via a first wireless communications protocol, the audio including music audio and non-music audio;
   a transmitter to output the received music audio via a second wireless communications protocol, different from the first wireless communications protocol, while preventing an output of the non-music audio via the transmitter;
   a speaker to output the received non-music audio concurrently with the output of the received music audio by the transmitter; and
   a processor to receive configuration instructions and activate the transmitter in response to the configuration instructions.

12. The wireless listening device of claim 11, where the second wireless communications protocol comprises frequency modulation (FM) broadcasting.

13. The wireless listening device of claim 11, further comprising:
   an input device for receiving the configuration instructions.

14. The wireless listening device of claim 11, where the configuration instructions include:
   transmitter activation instructions to activate the transmitter, and
   a broadcast frequency on which the transmitter, activated based on the transmitter activation instructions, outputs the received music audio.

15. The wireless listening device of claim 11, where the configuration instructions include non-music audio handling instructions.

16. The wireless listening device of claim 11, where the short-range wireless transceiver comprises:
   a Bluetooth transceiver.

17. A device, comprising:
   means for receiving audio signals from a source audio device via a Bluetooth connection, where the audio signals comprise music audio signals and non-music audio signals;
   means for receiving non-music audio handling instructions;
   means for transmitting the music audio signals, received from the source audio device, via a frequency modulation (FM) frequency signal while selectively preventing, based on the received non-music handling instructions, a transmission of non-music audio signals via the FM frequency signal; and
   means for outputting, while transmitting the music audio signals, the non-music audio signals, received from the source audio device, based on the received non-music handling instructions.

18. The device of claim 17, where the non-music audio handling instructions indicate that non-music audio is not to be transmitted via the FM frequency signal.

19. The device of claim 18, further comprising:
   means for muting the music audio signals while continuing to transmit the music audio signals via the FM frequency signal.

20. The device of claim 18, further comprising:
   means for activating a speakerphone feature based on the non-music audio handling instructions; and
   where the means for outputting the non-music audio signals outputs the non-music audio signals via a speaker of the device.

* * * * *